United States Patent
Grass et al.

(10) Patent No.: US 7,228,488 B1
(45) Date of Patent: *Jun. 5, 2007

(54) SYSTEM AND METHOD FOR SECURE COMMUNICATION OVER PACKET NETWORK

(75) Inventors: John Grass, Fremont, CA (US); Terry Hardie, Union City, CA (US); Tony Hardie, Ellerslie (NZ)

(73) Assignee: Network Equipment Technologies, Inc., Fremont, CA (US)

( * ) Notice: Subject to any disclaimer, the term of this patent is extended or adjusted under 35 U.S.C. 154(b) by 566 days.

This patent is subject to a terminal disclaimer.

(21) Appl. No.: 10/367,669

(22) Filed: Feb. 14, 2003

Related U.S. Application Data

(60) Provisional application No. 60/357,364, filed on Feb. 15, 2002.

(51) Int. Cl.
*H03M 13/00* (2006.01)
(52) U.S. Cl. ...................................................... 714/776
(58) Field of Classification Search ................ 714/775, 714/789
See application file for complete search history.

(56) References Cited

U.S. PATENT DOCUMENTS

| | | | |
|---|---|---|---|
| 5,404,394 A | 4/1995 | Dimolitsas et al. | |
| 5,426,643 A * | 6/1995 | Smolinske et al. | ......... 370/506 |
| 5,600,663 A | 2/1997 | Ayanoglu et al. | |
| 5,724,414 A | 3/1998 | Dimolitsas et al. | |
| 5,870,412 A | 2/1999 | Shuster et al. | |
| 5,963,621 A | 10/1999 | Dimolitsas et al. | |
| 6,141,788 A | 10/2000 | Rosenberg et al. | |
| 6,157,642 A | 12/2000 | Sturza et al. | |
| 6,243,846 B1 | 6/2001 | Schuster et al. | |
| 6,272,633 B1 * | 8/2001 | Duke et al. | .................. 713/171 |
| 6,289,054 B1 | 9/2001 | Rhee | |
| 6,445,717 B1 | 9/2002 | Gibson et al. | |
| 6,477,669 B1 | 11/2002 | Agarwal et al. | |
| 6,490,705 B1 | 12/2002 | Boyce | |
| 6,675,340 B1 | 1/2004 | Hardie et al. | |
| 6,771,674 B1 | 8/2004 | Schuster et al. | |
| 6,839,330 B1 | 1/2005 | Chitre et al. | |
| 7,017,102 B1 | 3/2006 | Hardie et al. | |
| 2002/0031126 A1 * | 3/2002 | Crichton et al. | ............. 370/394 |
| 2003/0026243 A1 * | 2/2003 | Oran et al. | .................. 370/352 |
| 2003/0179752 A1 | 9/2003 | Grass | |

OTHER PUBLICATIONS

O'Connor, John and Vaisnys, Arvydas. Implementation of Secure Voice (STU-III) Into The Land Mobile Satellite System. Jun. 1, 1992.*

(Continued)

*Primary Examiner*—Guy Lamarre
*Assistant Examiner*—Sam Rizk
(74) *Attorney, Agent, or Firm*—Townsend and Townsend and Crew LLP

(57) ABSTRACT

A system capable of supporting secure communication over a packet-based network is provided. The system includes a transmit terminal adapted to transmit information. A secure terminal relay is coupled to the transmit terminal and configured to receive the information. The information is then converted into baseband information. A communication gateway coupled to the secure terminal relay is configured to receive the baseband information from the secure terminal relay. The baseband information is then packetized for transmission over the packet-based network.

22 Claims, 2 Drawing Sheets

OTHER PUBLICATIONS

U.S. Appl. No. 10/161,196, filed May 31, 2002, Kristensson.
U.S. Appl. No. 09/693,782, filed Oct. 19, 2000, Hardie.
Li, Chung-Sheng, et al., "Implementation and Performance Analysis of Congestion-Tolerant Isochronous Communication in ATM Networks Using Diversified Routing," Conference Records IEEE International Conference, 1994, pp. 1341-1345.

Li et al. (Chung-Sheng Li and C.J. Georgiou; Implementation and performance analysis of congestion-tolerant isochronous communication in ATM networks using diversified routing; Conference Record IEEE International Conference on Communications Serving Human.

* cited by examiner

SYSTEM AND METHOD FOR SECURE COMMUNICATION OVER PACKET NETWORK

CROSS-REFERENCES TO RELATED APPLICATIONS

This application claims the benefit of the filing date of U.S. Provisional Patent Application No. 60/357,364 filed Feb. 15, 2002, which is incorporated by reference in its entirety for all purposes.

The following applications are related to the present application:
- U.S. Pat. No. 6,675,340, entitled "Forward Error Correction (FEC) for Packetized Data Networks", filed on May 31, 2002;
- U.S. patent application Ser. No. 09/693,788, entitled Forward Error Correction (FEC) for Packetized Data Networks", filed on Oct. 19, 2000;
- U.S. Provisional Patent Application No. 60/345,582, entitled Forward Error Correction (FEC) for Packetized Data Networks", filed on Dec. 27, 2001;
- U.S. patent application Ser. No. 09/693,782 entitled "System and Method for Frame Packing", filed on Oct. 19, 2000; and
- U.S. patent application Ser. No. 10/101,420 entitled "Reliable Transport of TDM Data Streams Over Packet Networks", filed on Mar. 19, 2002, which are all incorporated by reference in their entirety for all purposes.

BACKGROUND OF THE INVENTION

The present invention generally relates to a system for supporting secure communication of information and more specifically to a system for conducting the U.S. Government's Secure Terminal Unit-III (STU-III) and the NATO version STU-IIb communications over packet networks.

For certain applications, it is necessary to be able to establish secure communications between multiple terminals. The U.S. Government's Secure Terminal Unit-III (STU-III) and the NATO version STU-IIb are examples of such systems. The secure communications are typically realized by the use of encryption technology within the terminals. In a standard network connection, two terminals are connected together across a telephone network. Typically, the telephone network is digital and converts the analog transmissions from the terminal to a digital stream at, e.g., 64 kb/s using Pulse Code Modulation (PCM) techniques for the digitization. Once a connection is established between the two terminals, the call switches from a regular voice call to a modem (modulator-demodulator) call. Basically, STU works by establishing a special modem call between the terminals. Over the modem call, the encrypted voice communications are sent. The analog modem signal is captured, digitized at the start of the digital circuit using PCM, and within certain parameters, faithfully reproduced at the other end.

A technique has been previously introduced to reduce the amount of bandwidth required in the digital network to carry the STU call. This technique, called a STU relay, demodulates the STU call that entered the digital network, and only transmits the baseband data. At the other end of the network, the baseband data is re-modulated so as to transmit the expected signal to the other terminal. This demodulation and re-modulation by the relay is transparent to the terminals. This approach reduces the required bandwidth to transmit the baseband data to between 2.4 and 9.6 kb/s, which is considerably less that the regular 64 kb/s bandwidth used for calls that are not demodulated. Hence the value of the STU relay.

STU relay communications transfer data in a synchronous data stream. Thus, STU relay communications have been limited to synchronous networks, such as public switched telephone networks (PSTNs) and low-rate digital networks. In a synchronous network, data, whether it be idle bits or data, have to be sent at all times through a dedicated connection. Also, data is received exactly as it is transmitted. Thus, if data is sent from time, t=0 to t=100, idle bits from t=100 to t=500, and data from t=500 to t=600, the data and idle bits will be received by a receiver with the same time intervals although there may be a delay for transmitting the data from the transmitter to the receiver. Accordingly, if the first bit of data is received at a t=1000, the receiver receives data from t=1000 to t=1100, idle bits from t=1100 to t=1500, and data from t=1500 to t=1600. From the above, the data is received exactly as transmitted and the gap where idle bits were sent is the same as transmitted. Thus, STU relay communications have the advantage that data is received as it is sent; however, the communications are limited to synchronous networks.

Accordingly, there is a desire for developing a system for supporting secure transmission of information over asynchronous networks, such as packet-based networks.

BRIEF SUMMARY OF THE INVENTION

Embodiments of the present invention provides systems and methods for supporting secure communication over packet networks such as a VoIP network.

In one embodiment, a system capable of supporting secure communication over a packet-based network is provided. The system includes a transmit terminal adapted to transmit information. A secure terminal relay is coupled to the transmit terminal and configured to receive the information. The information is then converted into baseband information. A communication gateway coupled to the secure terminal relay is configured to receive the baseband information from the secure terminal relay. The baseband information is then packetized for transmission over the packet-based network.

In another embodiment, a system capable of supporting secure communication over a packet-based network is provided. The system includes a communication gateway configured to receive packetized information from the packet-based network. The packetized information is then converted into baseband information. A secure terminal relay coupled to the communication gateway is configured to receive the baseband information from the communication gateway. The baseband information is then converted into a synchronous data stream. The data stream is then sent to a receiver terminal.

A further understanding of the nature and advantages of the invention herein may be realized by reference of the remaining portions in the specifications and the attached drawings.

DETAILED DESCRIPTION OF THE INVENTION

Figure 1:
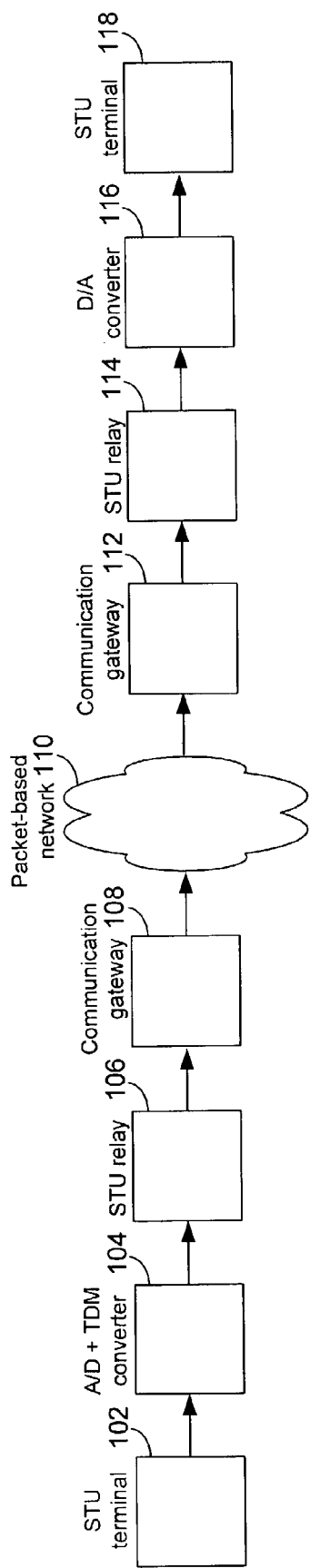
FIG. 1 depicts a simplified block diagram of a system according to one embodiment of the present invention.

FIG. 1 depicts a simplified block diagram of a system 100 according to one embodiment of the present invention. It will be understood that the embodiment described herein is described in the context of a system using STU for illustrative purposes only. The present invention is therefore not limited to a system using STU and may, in alternative embodiments, implement systems using other types of terminals and relays that facilitates secure processing of information.

Referring to FIG. 1, according to an embodiment of the present invention, system 100 includes a STU terminal 102, an analog/digital (A/D) and time division multiplex (TDM) converter 104, a STU relay 106, a communication gateway 108, a packet-based network 110, a communication gateway 112, a STU relay 114, a digital/analog (A/D) converter 116, and a STU terminal 118. System 100 is configured to communicate data through packet-based network 110 using STU. Thus, the advantages of securely communicating using STU are realized through a packet-based network.

STU terminal 102 receives an indication to connect a call and generates an analog signal. The analog signal is then sent to A/D and TDM converter 104. Converter 104 converts the analog signal into a digital signal. Additionally, in one embodiment, converter 104 includes TDM circuitry that converts the digital signal into a TDM signal. The TDM signal is designed to be transmitted over a synchronous network. As will be discussed below, the TDM signal, however, will be converted and transmitted over an asynchronous network. The TDM signal is then supplied to STU relay 106.

STU relay 106 is configured to determine if the signal is, e.g., a regular voice call or a STU modem call. If it is determined that the call is a regular voice call, STU relay 106 does not modify the signal and passes it to communication gateway 108. If it is determined that the call is a STU call, STU relay 106 initiates its STU relay functionality. For example, STU relay modulates the modem signals into baseband information and sends the baseband information to communication gateway 108. A STU call is initiated from an established regular voice call. The STU call starts with modem training between the two STU devices. After the modem session is established, modulated modem data signals are exchanged between the devices.

When communication gateway 108 receives the signal from STU relay 106, it packetizes the signal. In packetizing the signal, a synchronous data stream is converted into an asynchronous data stream by communication gateway 108. In one embodiment, the synchronous data stream is converted into a Voice over Internet Protocol (VoIP) signal for transmission over packet-based network 110. In other embodiments, the signal may be converted into other formats such as frame relay or asynchronous transfer mode (ATM). Various VoIP signaling protocols may be used, such as H.323, SIP, or other proprietary protocols. Also, signaling protocols other than VoIP may be used such as Voice over ATM or Voice over Frame Relay.

Communication gateway 108 maintains a call through packet-based network 110 to communication gateway 112. In one embodiment, the call is maintained through the use of VoIP signaling protocols and is a connectionless call. Data is communicated through packet-based network 110 by parsing the stream of TDM data received from STU relay 106 into frames of data. The frames of data are then put into VoIP packets. VoIP packetizing techniques where multiple calls (voice calls and/or STU modem calls) are packed in the same IP packet may be used. For example, frame packing techniques may be used as described in application Ser. No. 09/693,782 entitled "System and Method for Frame Packing", filed on Oct. 19, 2000, which is incorporated by reference in its entirety for all purposes. The VoIP packets are then transmitted across packet-based network 110 to the destination communication gateway 112.

Data is transferred through packet-based network 110 in the IP packets to communication gateway 112. Packet-based network 110 may be any packet-based network such as a frame relay or asynchronous transfer mode (ATM) network.

Communication gateway 112 is configured to receive the data packets transferred through packet-based network 110 and convert the packets into a synchronous data stream. In one embodiment, the synchronous data stream is a TDM data stream. Communication gateway 112 may also use techniques that ensure a faithful recomposition of the original STU modem data stream. The STU modem stream is then transmitted to the terminating STU relay 114.

STU relay 114 is configured to demodulate the synchronous data stream so that the baseband data is converted into the expected signal that was transmitted from STU terminal 102. The demodulated signal is then transmitted to D/A converter 116 where it is converted from digital to analog and transferred to the destination STU terminal 118.

Figure 2:
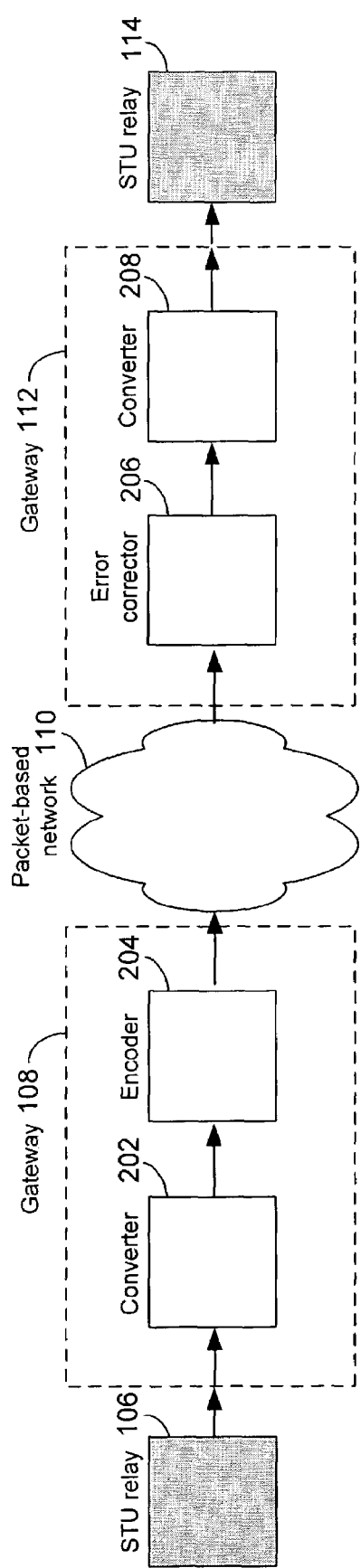
FIG. 2 illustrates a more detailed block diagram of a first communication gateway and a second communication gateway according to one embodiment of the present invention.

FIG. 2 illustrates a more detailed block diagram of communication gateway 108 and communication gateway 112 according to one embodiment of the present invention. As shown, gateway 108 includes a converter 202 and an encoder 204, and gateway 112 includes an error corrector 206 and a converter 208.

Converter 202 is configured to convert a synchronous data stream received from STU relay 106 to an asynchronous data stream. In one embodiment, techniques for performing the conversion are disclosed in U.S. patent application Ser. No. 10/101,420 entitled "Reliable Transport of TDM Data Streams Over Packet Networks", filed on Mar. 19, 2002 and hereby incorporated by reference in its entirety for all purposes. In a specific embodiment, converter 202 takes the data stream that was converted into the baseband information and converts it into an asynchronous data stream. In a specific embodiment, the asynchronous data stream is in the form of a VoIP protocol. In one embodiment, the asynchronous data stream is created by segmenting the digitized baseband information into preset frames of data, or packets of data. Converter 202 then sends the converted asynchronous data stream to encoder 204.

Encoder 204 is configured to encode the converted asynchronous data stream. For example, encoder 204 is configured to perform forward error correction (FEC). In one embodiment, techniques for performing forward error correction are described in U.S. patent application Ser. No. 10/161,196, entitled "Forward Error Correction (FEC) for Packetized Data Networks", filed on May 31, 2002; U.S. patent application Ser. No. 09/693,788, entitled Forward Error Correction (FEC) for Packetized Data Networks", filed on Oct. 19, 2000; U.S. Provisional Patent Application No. 60/345,582, entitled Forward Error Correction (FEC) for Packetized Data Networks", filed on Dec. 27, 2001, which are incorporated by reference in their entirety for all purposes. In one embodiment, encoder 204 uses a Reed/Solomon encoding technique for performing FEC. Also, a person skilled in the art will appreciate other methods for error correction that may be used.

Forward error correction is used to provide redundancy for the data that is being transmitted in packets. Asynchronous networks, such as packet-based networks, are connectionless networks. The networks offer no guarantee of success in transferring data (i.e., they are unreliable). Thus, packets of data may be lost. In the case where a data packet is lost, FEC may be used to determine the data that was found in the lost data packet. Thus, any errors that occur at the receiver side may be corrected using the redundant information.

Forward error correction (FEC) may be used to improve transmission reliability for data packets transmitted on a packetized data network, such as an Internet Protocol (IP) network. Packets containing error data are transmitted separately from corresponding voice packets. The error packets are transmitted a predetermined number of packets before the voice packets, to increase the probability that either the voice packet or error packet will be received. The error packets are preferably created using a Reed-Solomon algorithm. This approach greatly reduces the amount of error data that needs to be transmitted, without substantially increasing latency.

After encoding the data shown, encoder 204 packetizes the asynchronous data stream and sends the packets through packet-based network 110 to communication gateway 112. Error corrector 206 receives the transmitted packets and regenerates the asynchronous data stream. If any errors occurred in the transmission or any packets were lost, error corrector 206 uses FEC to resolve the errors. Thus, it ensures that the data received is as transmitted.

Error corrector 206 then sends the data to converter 208. Converter 208 is configured to convert the asynchronous data stream to a synchronous data stream. Additionally, converter 208 may utilize techniques such as jitter control to regenerate the data. Converter 208 ensures a successful re-composition of the original STU modem data stream is accomplished. This is accomplished by arranging the frames or packets of data recovered from the asynchronous data stream into the synchronous data stream. The synchronous data is then converted into baseband data.

The baseband data is then sent to STU relay 114.

It is to be understood that the above describes a specific embodiment of the invention, and that alternatives, modifications and equivalents are possible. For example, the system may be configured for secure communication of information other than voice signals such as fax and data. The invention is also applicable to packet networks other than IP, such as Frame Relay or ATM.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for securely communicating data through a packet-based network, the method comprising:
    converting a synchronous data stream into baseband data;
    converting the baseband data into an asynchronous data stream;
    packetizing the asynchronous data stream into data packets;
    performing forward error correction for the data packets wherein forward error correction comprises creating separate error correction data corresponding to each of the data packets; and
    sending the data packets through the packet-based network, wherein the separate error correction data for each of the corresponding data packets is transmitted a predefined number of packets before each of the data packets.

2. The method of claim 1, wherein the packet-based network comprises a Voice Over Internet Protocol (VOIP) network.

3. The method of claim 1, further comprising receiving the synchronous data stream at a secure terminal.

4. The method of claim 3, wherein the secure terminal is a STU terminal.

5. A method for securely communicating data through a packet-based network, the method comprising:
    receiving an asynchronous data stream in data packets from the packet-based network;
    performing forward error correction for the received data packets, wherein forward error correction comprises using the separate error correction data corresponding to each of the data packets that is transmitted a predefined number of packets before each of the data packets to recover missing or corrupted data;
    converting the asynchronous data into a synchronous data stream;
    converting the synchronous data into baseband data; and
    sending the baseband data to a secure terminal.

6. The method of claim 5, wherein the secure terminal comprises a STU terminal.

7. The method of claim 5, wherein converting the asynchronous data in the STU communication format into synchronous data comprises performing jitter control.

8. The method of claim, wherein the packet-based network comprises a Voice Over Internet Protocol (VOIP) network.

9. A system capable of supporting secure communication over a packet-based network, the system comprising:
    a transmit terminal adapted to transmit information;
    a secure terminal relay coupled to the transmit terminal and configured to receive the information and to convert the information into baseband information;
    a communication gateway coupled to the secure terminal relay and configured to receive the baseband information from the secure terminal relay and packetize the baseband information for transmission over the packet-based network; and
    an encoder configured to perform forward error correction for the packetized information, wherein forward error correction comprises creating separate error correction data corresponding to each of the data packets, wherein the separate error correction data for each of the corresponding data packets is transmitted a predefined number of packets before each of the data packets.

10. The system of claim 9, wherein the communication gateway comprises a synchronous to asynchronous converter configured to convert the information to an asynchronous data stream.

11. The system of claim 9, wherein the transmit terminal comprises a STU terminal.

12. The system of claim 9, wherein the secure terminal relay comprises a STU relay.

13. A system capable of supporting secure communication over a packet-based network, the system comprising:
    a communication gateway configured to receive packetized data packets from the packet-based network and convert the packetized data packets into a synchronous data stream;
    an error corrector configured to perform forward error correction for the packetized information, wherein forward error correction comprises using the separate error correction data corresponding to each of the data packets that is transmitted a predefined number of packets before each of the data packets to recover missing or corrupted data;

a secure terminal relay coupled to the communication gateway and configured to receive the synchronous data stream from the communication gateway and convert the synchronous data stream into baseband information; and a receiver terminal configured to receive the data stream.

14. The system of claim 13, wherein the communication gateway comprises an asynchronous to synchronous converter configured to convert the packetized information to the synchronous data stream.

15. The system of claim 13, wherein the receiver terminal comprises a STU terminal.

16. The system of claim 13, wherein the secure terminal relay comprises a STU relay.

17. A method for securely communicating data through a packet-based network using a first and second STU terminal, the method comprising:

providing secure data from a first STU terminal to a first STU relay;

packetizing the secure data into data packets, wherein packetizing comprises performing forward error correction for the secure data, wherein forward error correction comprises creating separate error correction data corresponding to each of the data packets, wherein the separate error correction data for each of the corresponding data packets is transmitted a predefined number of packets before each of the data packets;

sending the data packets from the first STU relay to a second STU relay through the packet-based network;

performing forward error correction for the packetized data performing forward error correction for the received data packets wherein forward error correction comprises using the separate error correction data corresponding to each of the data packets that is transmitted a predefined number of packets before each of the data packets to recover missing or corrupted data;

converting the data packets to the secure data for a STU call; and sending the secure data to the second STU terminal.

18. The method of claim 17, further comprising converting the secure data into baseband data.

19. The method of claim 17, further comprising converting the packetized data into baseband data.

20. The method of claim 17, further comprising converting the baseband data into the secure data.

21. The method of claim 17, wherein the packet-based network comprises a Voice Over Internet Protocol (VOIP) network.

22. A system capable of supporting secure communication over a packet-based network, the system comprising:

a first STU terminal that generates secure data;

a first STU relay that receives the secure data and configured to initiate a STU call for the secure data;

a first communication gateway coupled to the STU relay and configured to receive the secure data from the first STU relay and packetize the data for transmission over the packet-based network, the first communication gateway including an encoder configured to perform forward error correction for the packetized information, wherein forward error correction comprises using the separate error correction data corresponding to each of the data packets that is transmitted a predefined number of packets before each of the data packets to recover missing or corrupted data;

a second communication gateway configured to receive packetized information from the packet-based network and convert the packetized data into a synchronous data stream, the second communication gateway including an error corrector configured to perform forward error correction for the received data packets, wherein forward error correction comprises using the separate error correction data corresponding to each of the data packets that is transmitted a predefined number of packets before each of the data packets to recover missing or corrupted data;

a second STU relay coupled to the communication gateway and configured to receive the synchronous data stream from the communication gateway and convert the synchronous data into the secure data; and a receiver terminal configured to receive the secure data.

* * * * *